United States Patent [19]
Sigmund

[11] 3,825,051
[45] July 23, 1974

[54] SELF-LOCKING BOLT
[75] Inventor: Jerry A. Sigmund, Willow Grove, Pa.
[73] Assignee: Standard Pressed Steel Co., Jenkintown, Pa.
[22] Filed: May 24, 1972
[21] Appl. No.: 256,468

[52] U.S. Cl. .............................................. 151/37
[51] Int. Cl. ............................................ F16b 39/28
[58] Field of Search ............. 151/37, 34, 35, 39, 40, 151/41, 41.73; 85/9 R, 32 R

[56] References Cited
UNITED STATES PATENTS
| | | |
|---|---|---|
| 844,750 | 2/1907 | Rieschick............................. 151/37 |
| 1,009,801 | 11/1911 | Shinn et al............................ 151/39 |
| 1,316,084 | 9/1919 | Dake..................................... 151/37 |
| 2,249,921 | 7/1941 | Van Sant.............................. 151/37 |
| 3,087,525 | 4/1963 | Nyswaner ........................ 151/37 X |
| 3,389,734 | 6/1968 | Gutshall............................... 151/37 |
| 3,605,845 | 9/1971 | Junker.................................. 151/37 |

FOREIGN PATENTS OR APPLICATIONS
| | | | |
|---|---|---|---|
| 477,143 | 12/1937 | Great Britain........................ 151/37 |
| 109,074 | 12/1943 | Sweden................................ 151/37 |

Primary Examiner—Ramon S. Britts
Attorney, Agent, or Firm—Andrew L. Ney; Robert P. Seitter

[57] ABSTRACT

A self-locking fastener having a serrated segment within the bearing surface of the fastener arranged to penetrate a workpiece so that a resistance to loosening of the fastener from the workpiece is created. The fastener includes a polygon shaped bearing surface, such as a hex-head or 12-point bolt head or nut where the serrated segment is formed within an annular segment so that circumferentially discontinuous smooth-faced outer bearing surfaces are formed across adjacent flats of the polygon configuration.

9 Claims, 4 Drawing Figures

SELF-LOCKING BOLT

The present invention relates to self-locking fasteners and, in particular, to bolts and nuts having a polygon shape bearing surface, such as hex-head or 12-point bolts or nuts, which are provided with an annular serrated segment within the bearing surface to provide resistance against the fastener becoming loosened unintentionally after it has been seated.

A serious problem in joints secured together by threaded fastener members is the possibility of joint separation due to a nut backing-off from a bolt or a bolt backing-out from a nut or other internally threaded member. Generally, this result can occur when the joint is subjected to vibrations.

Various proposals have been suggested in the past to either eliminate or greatly reduce the unintentional loosening of threaded members. Because of the wide variety of applications in which this undesirable result can occur, many different types of locking devices have been developed. One approach has been to treat the bearing surface of the fastener in such a manner that the resistance to relative rotation between the fastener and a workpiece in which the fastener is installed is greater than the resistance to relative movement between the mating threads. As a result, the resistance to rotation between the mating threaded parts no longer is a critical factor in determining whether the threaded parts will turn relative to one another.

One important requirement of these fasteners is that the "off" torque (torque required to loosen a tightened fastener) be greater than the "on" torque (torque required to seat a fastener properly). This relationship should exist for several installations and removals of the fastener.

Because the bearing surface of these fasteners, for the most part, are serrated or are provided with teeth or the like which are arranged to dig into the workpiece to create resistance to relative rotation between the fastener and the workpiece, some damage or marring of the workpiece bearing surface will occur as these fasteners are seated and removed. Such damage to the workpiece causes it to weaken. Hence, a second important requirement of these fasteners is that the effects of marring or damage to the workpiece be minimized.

Generally, prior art fasteners provided with a locking characteristic in the bearing surface fail to satisfy concurrently these and other requirements. Those fasteners available at the present time having improved "off" torque to "on" torque ratios dig into the workpiece in such a manner or to such an extent as to weaken greatly the workpiece. "Notch" effect, the buildup of stress concentration, is a common result and may cause fatique failure of the clamped parts. This problem becomes more acute as the thickness of the workpiece is reduced. Those fasteners available at the present time having reduced adverse effects on the workpiece provide insufficient "off" torque.

The drawbacks of this type of prior art fastener are overcome in a fastener such as that disclosed in commonly assigned U.S. Pat. No. 3,605,845. This patent discloses a self-locking fastener which provides a resistance to unintended rotation between the fastener and the workpiece and yet causes a minimum amount of marring of the workpiece surface with which the fastener bearing surface is in contact. This is accomplished by providing a smooth surface annular ring about a plurality of radially disposed serrations which, upon engagement with the workpiece, oppose further penetration of the serrations and controls the extent of penetration of the serrations.

In co-pending application Ser. No. 228,210 filed Feb. 22, 1972, now abandoned, a self-locking fastener is disclosed which is provided with a stress regulating configuration within the locking mechanism itself to control the extent of penetration of the fastener into the workpiece. In this application a plurality of serrations disposed within a smooth surface annular ring on the head of a bolt or the face of a nut body are provided with a stress regulating configuration such as a radiused edge or a flattened ridge to limit the extent of penetration of the bearing surface of the fastener into the surface of a workpiece.

The present invention provides a fastener of the general character described where a rotation resistant feature such as a plurality of serrations on the bearing surface of the fastener are employed upon a fastener having a polygon shape in cross section, for example a hex-head or 12-point head. The serrations are formed as an annular segment with the outer circumference of the annular segment dimensioned such that circumferentially discontinuous smooth-faced bearing surfaces are provided across adjacent flats of the polygon shaped fastener face.

It is therefore an object of the present invention to provide a new and improved self-locking fastener having a locking mechanism provided in the bearing surface of the fastener and which may also be provided with a stress regulating configuration within the locking mechanism to control the extent of penetration of the fastener into the workpiece.

It is another object of the present invention to provide a self-locking fastener of this type which provides improved resistance to unintended rotation between the fastener and a workpiece and yet causes a minimum amount of marring of the workpiece surface with which it is in contact.

Another object of the present invention is to provide a self-locking fastener for use on fasteners having a polygon shape in cross section where a rotation resistant surface is provided in the form of an annular ring segment which is dimensioned so as to provide a smooth faced discontinuous bearing surface across the flats of the polygon shaped fastener.

These and other objects of the present invention will be more fully understood after consideration of the following description taken in connection with the accompanying drawing.

Figure 1:
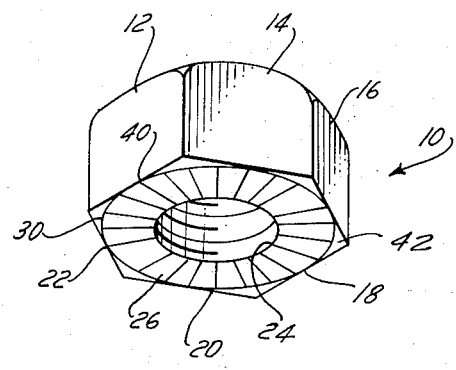
FIG. 1 is a perspective view showing a fastener such as a nut constructed in accordance with the present invention.
Figure 2:
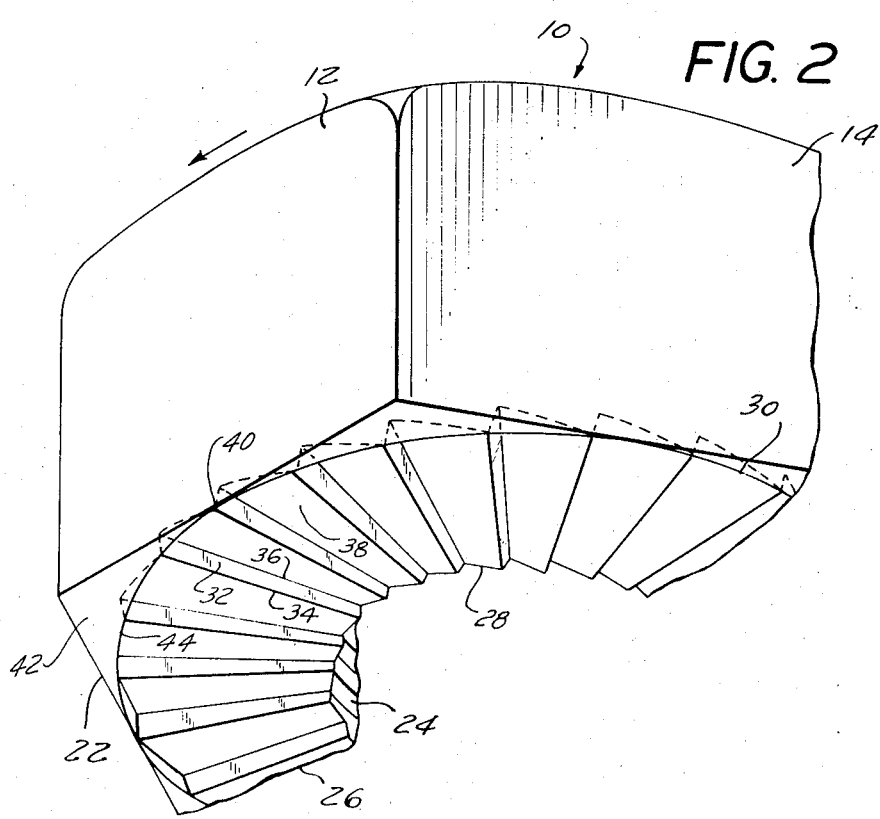
FIG. 2 is an enlarged partial perspective view showing one embodiment of the present invention.

With reference to the drawing and particularly FIGS. 1 and 2, a self-locking fastener such as a nut 10 constructed in accordance with the present invention is shown illustratively as a hex-nut having six flats or sides 12, 14, 16, 18, 20 and 22 which form a suitable wrenching surface. Nut 10 also includes an internally threaded bore 24 therethrough to cooperatively engage an externally threaded bolt.

The bearing surface 26 of nut 10, i.e., that surface of the nut to be placed in bearing contact against a workpiece, is provided with a plurality of serrations 28 confined within an annular ring segment 30. When the serrations 28 are viewed along a cylinder concentric with the longitudinal axis of the bolt, they are seen to be in the form of teeth. For the particular embodiment illustrated in FIG. 2, the teeth are generally saw-tooth in shape, and each include a wall or buttress 32 extending between the crest 34 of a given tooth and the root 36 of an adjacent tooth. An inclined surface 38 extends between the crest 34 and the root 36 of a tooth.

The maximum radial extent for the serrated annular segment 30 is selected to be at least coincident with the mid point 40 of a particular flat 12–22. This results in the formation of circumferentially discontinuous smooth surfaced bearing surfaces 42 across the flats of adjacent sides of the nut. The surfaces 42 are in the form of a continuous surface of substantial radial width. The term "substantial" in describing the surfaces 42 means a surface of finite width in contrast to a sharp edge.

The radially outermost ends of the crests 34 of the serrations within the annular segment 30 lie in an imaginary surface which meets the surfaces 42 along an arcuate line 44 without forming a step or wall between this imaginary surface and the surfaces 42. In addition, the crests 34 of the serrations lie in am imaginary surface which is a continuous, radially inward extension of the discrete surfaces 42.

Figure 3:
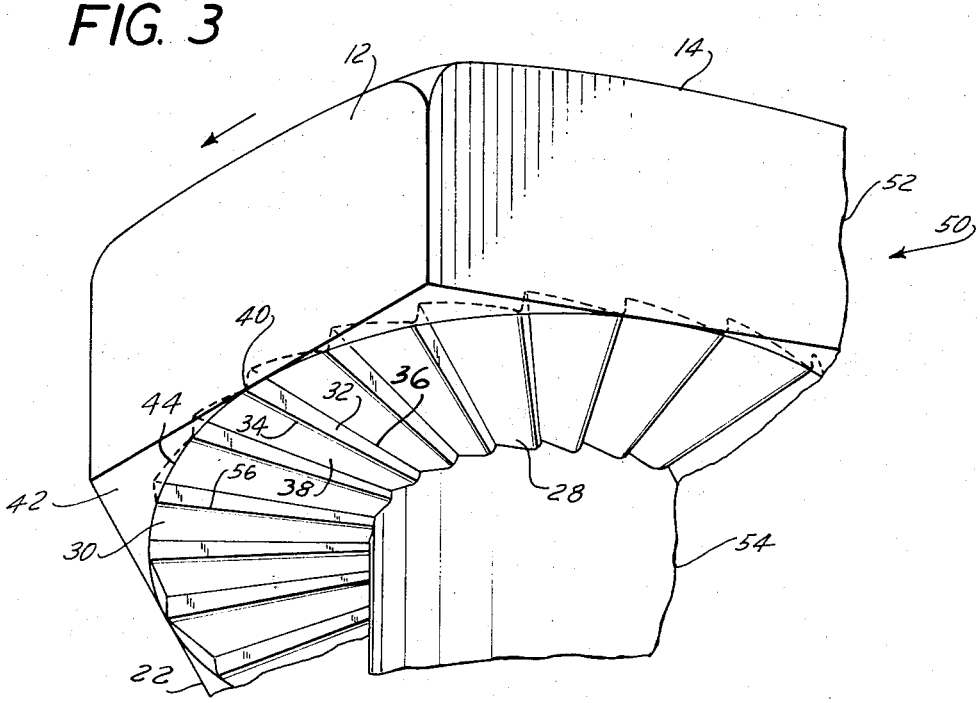
FIG. 3 is a view similar to FIG. 2 showing another embodiment of the present invention on a fastener such as a bolt.
Figure 4:
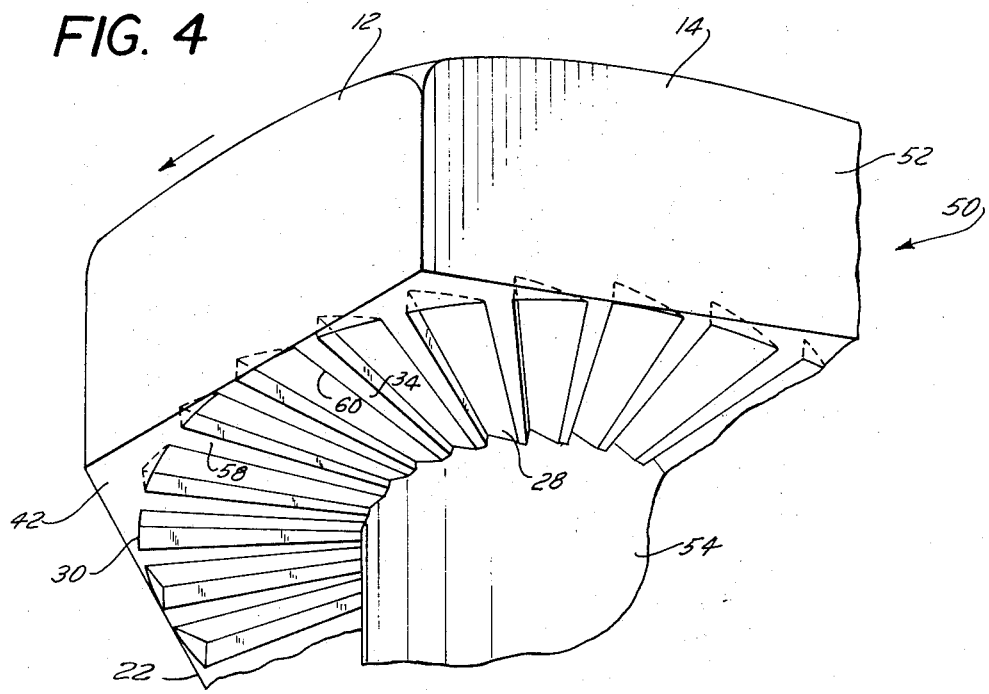
FIG. 4 is a view similar to FIG. 3 showing another embodiment of the present invention.

Reference is now made to FIGS. 3 and 4 which show alternate embodiments of the present invention as may be utilized either on a nut as shown in FIGS. 1 and 2 or on the bearing surface of the head of a bolt. In describing the alternate embodiments of FIGS. 3 and 4 like reference numerals are employed for those features which are similar to the features of the embodiment of FIGS. 1 and 2.

With particular reference to FIG. 3, a bolt 50 is shown having a head 52 and an integral shank 54 which may be threaded (not shown) at one end. The bolt head 52 is hexagonal in shape to provide sides 12, 14, etc., forming a suitable wrenching surface. The underside or bearing surface of bolt head 52 is provided with an annular ring segment 30 comprising a plurality of serrations 28 with the maximum radial extent of annular ring segment 30 being at least equal to the radial distance from the longitudinal axis of the bolt 50 to the midpoint 40 of a particular flat 12, 14, etc. Each of the serrations are tooth-like in form when viewed along a cylinder concentric with the longitudinal axis of the bolt and each include a wall or buttress 32 extending between the crests 34 of a given tooth and the root 36 of an adjacent tooth. An inclined surface 38 extends between the crests 34 of a tooth and the root 36 of the same tooth. The crests 34 of the serrations 38 are radiused as at 56, for example with a standard or compound radius or a smooth rounded blend, with the particular type of radius selected being dictated by a determination of the locking action desired and the degree of deformation of the workpiece which can be tolerated.

As in the embodiment described above, the plurality of smooth bearing surfaces 42 are formed to provide a continuous surface of substantial radius width in discrete segments across the flats of adjacent sides of the hex-head.

The embodiment of FIG. 4 is also illustrated as a bolt 50 with a head 52 and shank 54 and this embodiment differs from the embodiment of FIG. 3 in that the crests 34 of each serration 28 are formed with a flat or land 58 of finite width with the incline surface 38 extending between the root 36 of one tooth to the trailing edge 60 of the flat 58 on the crest 34 of the next adjacent tooth.

As the bolt or nut is turned for installation against a workpiece in the direction of the arrows, which direction is in the direction of the inclination of the incline surface 38, the bearing face of the bolt or nut bears against the workpiece and cold flow of the workpiece material takes place as the workpiece is engaged by the inclined surface of each serration. The cold flow material builds up behind each wall or buttress 32 on each serration. This build up creates an interlock between the fastener and the workpiece to create a resistance to rotation of the bolt or nut in the opposite direction. The extent of penetration of the serrations 28 in the workpiece is controlled accurately by a combination of the discrete smooth bearing surfaces 42 and, for the embodiments of FIGS. 3 and 4, by the surface of the radiused crest or the flats and lands on the crest of each serration. Where an embodiment utilizing the radiused crest is used, the smooth surface of the radiused segments opposes deeper penetration of the serrations. Where an embodiment utilizing the flats on the crests of the serrations is used the surface of the flats 58 oppose deeper penetration of the fastener into the workpiece. In any event, where any of the three embodiments for a particular shape for the serrations is used, it is primarily the basic configuration of the serrations with the incline in the direction of rotation to tighten the fastener terminating in a substantially vertical wall or buttress which provides the rotation resistant feature while limiting to a large extent the deformation or "brinelling" of the workpiece in combination with the plurality of flat bearing surfaces 42 radially outwardly of the annular serrated segment.

In addition, the plurality of circumferentially spaced flat bearing surfaces 42 provide a sufficient surface area of contact which as well as providing a surface which opposes further penetration of the serrations into the workpiece also captivates the stress concentrations in the workpiece and prevents the stress from spreading beyond the area covered by the fastener.

While the serrations have been disclosed and described as being radially oriented it is to be expressly understood that a skewed orientation for the serrations may also be employed with equally beneficial results and that each of the three separate embodiments described herein may be employed on the surface of a bolt head or the bearing surface of a nut as well.

What is claimed is:

1. A self-locking fastener having a polygon shaped workpiece bearing surface, said bearing surface provided with a plurality of serrations in the form of teeth when viewed along a cylinder concentric with the longitudinal axis of said fastener, each of said teeth including a wall extending between the crest of the tooth and the root of an adjacent tooth and an inclined surface extending between said crest of said tooth and the root of said tooth, whereby said teeth are contiguous with each other and cover the entire area of an annular segment defined by the radially outermost ends of said teeth, said annular segment having a radial extent coincident with the mid portion of the sides of said polygon and defining a plurality of circumferentially discontinuous smooth surface faces of substantial radial width across the flats of adjacent sides of said polygon, each of said bearing faces including a corner of said polygon, each of said sides of said polygon defining a continuous, uninterrupted substantially rectangular surface whereby an outer wall is formed around said annular segment.

2. A fastener as defined in claim 1 wherein the crests of the teeth of said serrations are provided with means to limit and control the extent of penetration of the serrations into a workpiece when the fastener is operatively engaged with said workpiece.

3. A fastener as defined in claim 2 wherein said means to limit and control the extent of penetration of said serrations into a workpiece comprises a radius formed on the crest of each of said serrations to provide a bearing surface to contact said workpiece and thereby limit and control the extent of penetration of the serrations into said workpiece.

4. A fastener as defined in claim 2 wherein said means to limit and control the extent of penetration of said serrations into a workpiece comprises a flat of finite width formed on the crest of each of said serrations to provide a bearing surface to contact said workpiece and thereby limit and control the extent of penetration of the serrations into said workpiece.

5. A fastener as defined in claim 1 wherein said fastener is a nut comprising a nut body having an internally threaded bolt receiving aperture therein and said workpiece bearing surface is on one end of said nut body about said bolt receiving aperture.

6. A fastener as defined in claim 5 wherein said hex is a hex-head nut.

7. A fastener as defined in claim 1 wherein said fastener is a bolt comprising a shank and a bolt head at one end of said shank and said workpiece bearing surface is on the workpiece contacting end of said bolt head.

8. A fastener as defined in claim 7 wherein said bolt head has a hexagon shape in cross-section.

9. A fastener as defined in claim 1 wherein said fastener has a free end portion and wherein the outermost periphery of said bearing faces is located closer in the axial direction to said free end portion than the inner periphery thereof.

* * * * *